Aug 5, 1941. T. L. FAWICK 2,251,443
ASSEMBLY FOR CLUTCHES, BRAKES, UNIVERSAL JOINTS, AND THE LIKE
Filed Sept. 19, 1936
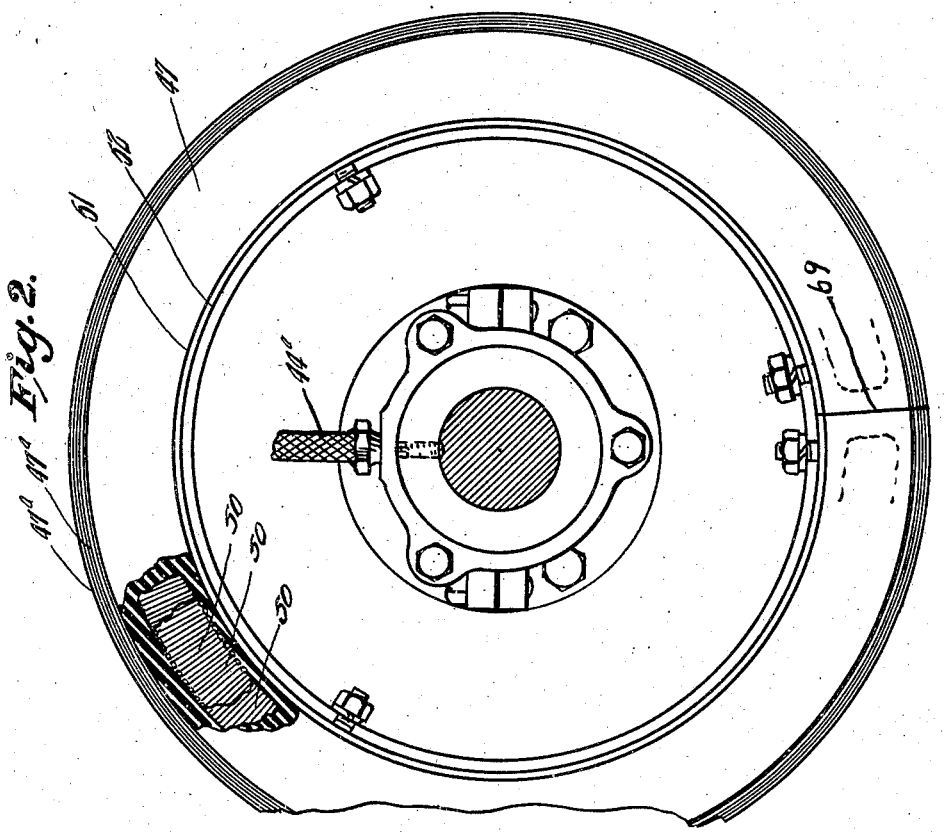
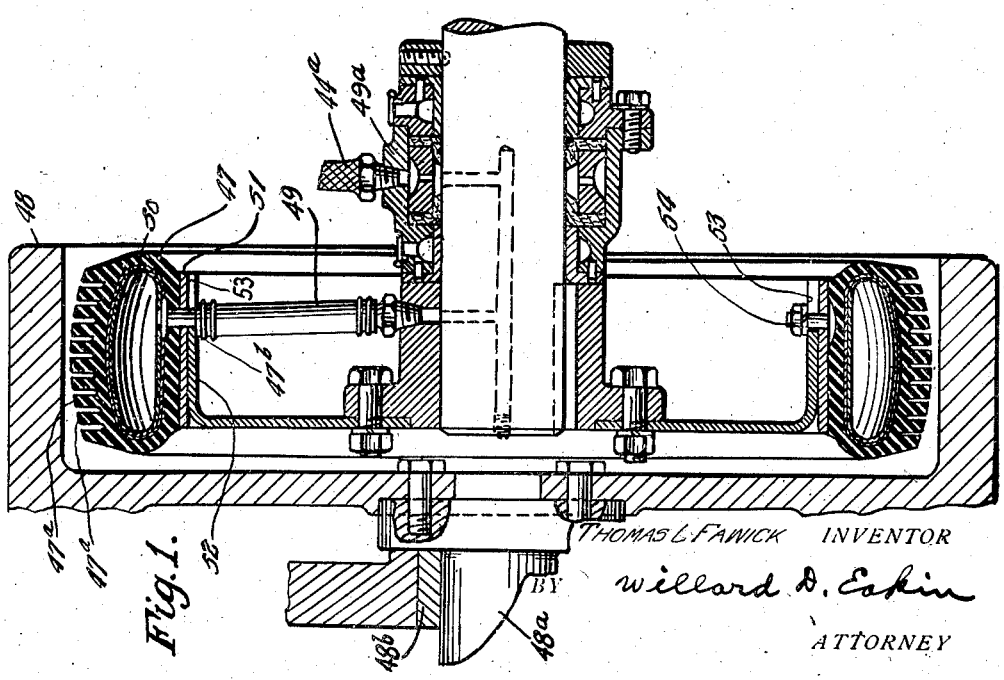
Thomas L. Fawick INVENTOR
BY Willard D. Eakin
ATTORNEY Patented Aug. 5, 1941

2,251,443

UNITED STATES PATENT OFFICE 2,251,443

ASSEMBLY FOR CLUTCHES, BRAKES, UNIVERSAL JOINTS, AND THE LIKE

Thomas L. Fawick, Akron, Ohio, assignor to The Fawick General Company, Inc., Akron, Ohio, a corporation of Indiana Application September 19, 1936, Serial No. 101,638

5 Claims. (Cl. 192—88)

This invention relates to assemblies adapted to be used in clutch or brake mechanisms and for similar purposes.

Its chief objects are to provide:

Simplicity and economy of construction; improved lubrication; durability; compensation for shaft mis-alignment; facility of replacement of parts; adaptability for fluid-pressure actuation; and desirable cushioning action.

This application discloses subject matter which is described and claimed in my U. S. Patents No. 2,111,422, granted March 15, 1938; No. 2,141,645, granted December 27, 1938; and No. 2,213,000, granted August 27, 1940.

Of the accompanying drawing:

Fig. 1 is a vertical, longitudinal section of a preferred embodiment of the invention.

Fig. 2 is an elevation of the structure shown in Fig. 1, as viewed from the right of that figure, parts being broken away to show internal structure and the driven shaft being shown in section.

Referring to the drawing, the embodiment of the invention which is here shown comprises a torque-transmitting, fluid-distensible bag 47 which is adapted to effect clutch engagement by a radially outward movement of its tread portion under the force of internal fluid-pressure, the bag preferably being mold-vulcanized to a radially flattened cross-sectional form so that upon deflation its tread portion will recede from engagement with the cylindrical inner surface of a bell-shaped fly-wheel 48 which serves as the female clutch member, the fly-wheel 48 being mounted upon a driving shaft 48ª journaled in a bearing 48ᵇ.

The bag in this embodiment has fluid connection through an armored hose 49 and a distributor ring assembly 49ª with an armored hose 44ª.

The bag being of flattened form when in an unstrained condition, and the radial dimension of the space between the base or inner periphery of the bag and the inner face of the bell member being correspondingly small, so that the tangential forces of the torque at its inner and outer peripheries are not widely offset from each other, the bag can be adequately reinforced by radial cords, as indicated at 50, 50, and such reinforcement, while adapted to withstand high fluid pressure within the bag for a given strength of cords, by reason of the small radius of curvature in the side-walls of the bag, also allows easy transverse shifting or weaving of adjacent parts of the bag-contacting members, such as occurs in the case of angular mis-alignment of the shafts, without substantial increase of strain on the cords, and it also allows substantial lateral off-setting of parallel shafts without such resistance and consequent strain as would be present if the cords were oblique, as oblique cords in such a construction act in the manner of tent-ropes or hammock-ropes in two arcs of the circle to resist such off-setting of the shafts.

In this embodiment the tire is formed with a rather highly crowned tread so that when it is distended it contacts with the bell first in its middle longitudinal zone and then progressively toward the sides of the tread, so that abrupt grabbing of the clutch is avoided notwithstanding the highly frictional character of rubber, and this crowned form of the tread is advantageous also in the case of angular misalignment of the shafts, in that it avoids concentration of the load on one narrow marginal zone of the tread such as would occur if the tread surface were of cylindrical form, as it came into engagement, in an angular position, with the cylindrical inner surface of the bell, although in the last mentioned situation also there would be a laterally progressive contacting of the two surfaces such as to prevent grabbing.

For strong frictional engagement and consequent avoidance of slippage after full clutch engagement the rubber tread of the bag in this embodiment is formed with high and narrow longitudinal ribs 47ª, 47ª, which have been found to be highly effective for that purpose in pneumatic tires running on pavements.

For facility of substitution of bags, and to permit the bags to be manufactured and shipped without such handling of heavy parts as would be necessary if the bag were vulcanized to the large metal part of the male clutch member, the bag is vulcanized to a relatively thin metal base ring 51, preferably of brass or bronze for the sake of strong vulcanized adhesion, the ring 51 being of such size as to fit snugly on its supporting member, 52, and the latter is formed with transverse slots, 53, 53, in one margin, to accommodate the bags inflating stem, 47ᵇ, and clamping bolts 54, 54, which occupy holes in the metal ring and have their heads on its outer surface and are mounted in the ring before the vulcanization of the bag upon it.

The bag 47 and its metal base 51, which can be of spring steel, are shown in Figure 4 as being arcuate but not endless, their ends meeting at 69, this construction being desirable for the easy removal and replacement of the bag and base assembly, as in case of repair.

The mode of operation has been fully brought out in conjunction with the foregoing description of the structure, and it will be seen that the invention provides the advantages that are set out in the above statement of objects.

I claim:

1. The combination of two rotary structures comprising respective individually journaled shafts and adapted for frictional engagement with each other, one of the same comprising a fluid-containing bag having torque-transmitting walls and a frictionally-engaging transversely curved tread surface adapted to be flattened against a part of the other structure, so as to have transversely-progressive contact therewith as the two surfaces are brought into engagement, and quick-acting means for bringing them into engagement, the bag having side-walls which are unconfined and free-flexing in service.

2. The combination of a pair of rotary structures comprising respective individually journalled shafts and adapted for frictional engagement with each other, one of the same comprising a fluid-containing bag having torque-transmitting walls and a frictionally-engaging, transversely curved tread surface adapted to be flattened against a part of the other structure so as to have transversely-progressive contact therewith as the two surfaces are brought into engagement, and means for conducting fluid into the bag during rotation thereof to distend it and thereby bring the two structures into frictional engagement with each other, the bag having side-walls which are unconfined and freely flexing in service.

3. The combination of two rotary structures comprising respective individually journaled shafts and adapted for frictional engagement with each other, one of the same comprising a fluid-containing bag and means for conducting a fluid into the bag during rotation of the bag, the bag being provided with a transversely curved outer surface so as to have transversely-progressive contact as it is flattened against another member, the bag having side-walls which are unconfined and freely-flexing in service.

4. A construction for resisting relative rotational movement of members comprising a friction surface on one of said members, a deformable rubber friction element on a second member, said friction element being arranged circumferentially on the member and having a fluid receiving chamber formed therein, a multiplicity of individually weak and laterally unstable upstanding circumferential ribs integrally formed on the friction element and normally directed toward said friction surface, and means through which fluid under pressure can be introduced to the chamber, said friction element arranged to be deformed, upon the introduction of fluid under pressure to the chamber, to move the ribs radially a sufficient distance to effect frictional engagement between said ribs and said friction surface while simultaneously elongating the ribs circumferentially, and the friction element further arranged, upon the release of fluid from the chamber, to return by inherent resiliency to normal position with the integral ribs withdrawn from the friction surface and retracted to their normal length.

5. A construction for resisting relative rotational movement of members comprising an annular friction surface on one of said members, a deformable annular rubber friction element on a second member and disposed within said friction surface, said friction element being arranged circumferentially on the member and having a fluid receiving chamber formed therein, a multiplicity of individually weak and laterally unstable upstanding ribs integrally formed on the friction element and extending peripherally thereof, said ribs being normally spaced from and directed toward said friction surface, and means through which fluid under pressure can be introduced to the chamber, said friction element being arranged, upon the application of fluid pressure to the chamber, to elongate circumferentially and to expand radially, to move the ribs radially a sufficient distance to effect frictional engagement between said ribs and said friction surface while simultaneously elongating and tensioning the ribs circumferentially whereby the ribs are stretched longitudinally prior to and during engagement with the friction surface.

THOMAS L. FAWICK.